(12) United States Patent
Regan et al.

(10) Patent No.: US 6,300,879 B1
(45) Date of Patent: Oct. 9, 2001

(54) WAKE-UP CIRCUIT FOR A REMOTELY LOCATED VEHICLE CONTROL MODULE

(75) Inventors: Patrick M. Regan, White Lake; Paul L. Farago, Clawson, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/359,461

(22) Filed: Jul. 22, 1999

(51) Int. Cl.[7] .................................................. G08B 21/00
(52) U.S. Cl. ......................... 340/654; 340/461; 340/635; 345/7
(58) Field of Search .................... 340/654, 635, 340/461; 345/7

(56) References Cited

U.S. PATENT DOCUMENTS

| | | |
|---|---|---|
| 4,371,934 | 2/1983 | Wahl et al. . |
| 4,574,269 | 3/1986 | Miller . |
| 4,663,718 | 5/1987 | Augello et al. . |
| 4,931,767 | 6/1990 | Albrecht et al. . |
| 4,965,550 * | 10/1990 | Wroblewshi .......................... 340/524 |
| 5,497,323 | 3/1996 | McCall et al. . |
| 5,576,687 | 11/1996 | Blank et al. . |
| 5,627,529 * | 5/1997 | Duckworth et al. ............ 340/825.69 |
| 5,682,267 | 10/1997 | Tonar et al. . |
| 5,708,410 | 1/1998 | Blank et al. . |
| 5,798,688 | 8/1998 | Schofield . |
| 5,825,147 | 10/1998 | Porter et al. . |
| 5,825,527 * | 10/1998 | Forgette et al. ...................... 359/267 |
| 5,844,505 | 12/1998 | Van Ryzin . |
| 5,883,605 * | 3/1999 | Knapp ....................................... 345/7 |

* cited by examiner

Primary Examiner—Julie Lieu

(57) ABSTRACT

A wake-up circuit is provided for a vehicle control module interconnected via a bus network to a vehicle data communication system of a motor vehicle. The wake-up circuit includes an input voltage source; a bus detection stage for detecting bus activity on the bus network, an input stage for supplying the input voltage, and an output stage for supplying an output voltage to the vehicle control module. In operation, the bus detection stage provides an input signal in response to detecting bus activity on the bus network. In response to receiving the input signal from the bus detection stage, the input stage supplies a voltage from the input stage to the output stage. The output stage in turn regulates the output voltage to the vehicle control module.

12 Claims, 6 Drawing Sheets

WAKE-UP CIRCUIT FOR A REMOTELY LOCATED VEHICLE CONTROL MODULE

BACKGROUND OF THE INVENTION

1. Field of the Invention

The present invention relates generally to a rearview mirror assembly for use in a motor vehicle and, more particularly, to a wake-up circuit for a remotely located vehicle control module embedded in a center-mounted rearview mirror assembly.

2. Discussion

Rearview mirrors, both center-mounted inside a vehicle passenger compartment and side-mounted outside the passenger compartment, are used to enable a driver of the vehicle to observe objects that are behind the vehicle while the driver's gaze remains directed generally forward. Such mirrors are ubiquitous means for providing actual visual images of objects that are behind the vehicles.

A significant amount of data is also presented to a driver of the vehicle in analog form (e.g., by gages) and/or in digital form (e.g., by digital display instrumentation). As recognized by the present invention, it can be advantageous to combine data sources not only to realize manufacturing cost savings, but also to promote safety and effectiveness in data presentation. In the context of a rearview mirror, the present invention recognizes that most drivers readily accept and use mirrors to know what objects are behind their vehicles, thereby improving driving safety. The present invention further recognizes that the use of mirrors can be promoted even further by presenting additional data on the mirrors to stimulate relatively more frequent use of the mirrors. Moreover, the effectiveness of the presentation of the data is improved by presenting data on a mirror that otherwise would be presented at a perhaps less convenient location in the vehicle. In other words, the present invention recognizes that it is possible that data presented on a mirror is more accessible than data presented in other locations that would not otherwise attract the driver's attention.

Nevertheless, problems exist with locating display devices on rearview mirror assemblies which may otherwise be exposed to considerable ambient light, such as in a convertible top vehicle. Therefore, it is also desirable to provide a display device for use in a mirror assembly, such as a liquid crystal display device, which does not exhibit diminished contrast when exposed to considerable ambient light.

It is further known to incorporate electronic components into the housing of a vehicle mirror assembly. For instance, it is known to mount courtesy lights and associated switches in the casing of an interior mirror assembly. In addition, electrochromatic rearview mirrors typically incorporate light sensors in order to detect light levels in the vicinity of the vehicle. In each of these cases, the electronic components are stand alone components which operate independent from the remainder of the vehicle data communication system.

On the contrary, a trip computer needs additional information from extraneous vehicle control modules in order to determine vehicle trip information. Most trip computers are located in the overhead console or in the instrument panel of the vehicle, and thus can be easily interfaced to the vehicle data communication system. However, in some convertible top vehicles there is no room to package a trip computer in the instrument panel of the vehicle.

Therefore, it is desirable to provide a rearview mirror assembly which incorporates a trip computer. In order to receive extraneous vehicle trip information, additional wires would have to be run from the trip computer in the mirror assembly to the instrument panel or other electronic components. As a result, the manufacturer would likely incur substantial additional costs for incorporating a trip computer into the mirror assembly. Thus, it is also desirable to interconnect the trip computer embedded in the mirror assembly via a single wire bus network to the other vehicle control modules in the vehicle. In this way, the trip computer no longer needs to be hardwired to receive an ignition on signal which is used to power up the mirror assembly. Moreover, the trip computer has access to any additional information needed for determining and displaying vehicle trip information. Lastly, it is desirable to provide a wake-up circuit which upon detection of bus activity over the bus network is able to power up the trip computer.

SUMMARY OF THE INVENTION

In accordance with the present invention, a wake-up circuit is provided for a vehicle control module interconnected via a bus network to a vehicle data communication system of a motor vehicle. The wake-up circuit includes an input voltage source; a bus detection stage for detecting bus activity on the bus network, an input stage for supplying the input voltage, and an output stage for supplying an output voltage to the vehicle control module. In operation, the bus detection stage provides an input signal in response to detecting bus activity on the bus network. In response to receiving the input signal from the bus detection stage, the input stage supplies a voltage from the input stage to the output stage. The output stage in turn regulates the output voltage to the vehicle control module.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
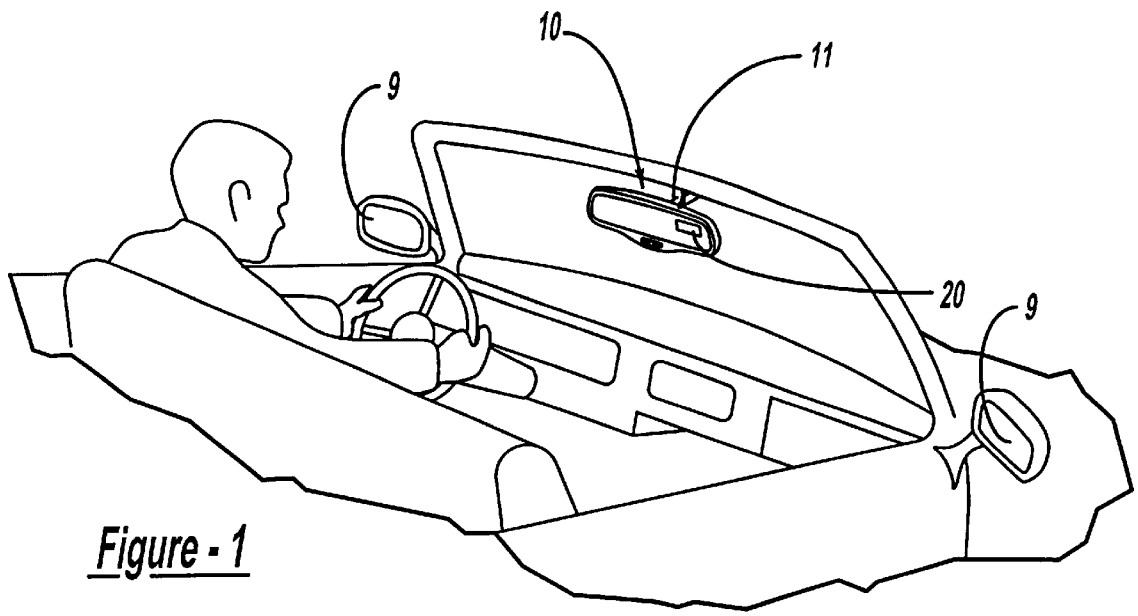
FIG. 1 is a schematic view of the interior of a motor vehicle.
Figure 4:
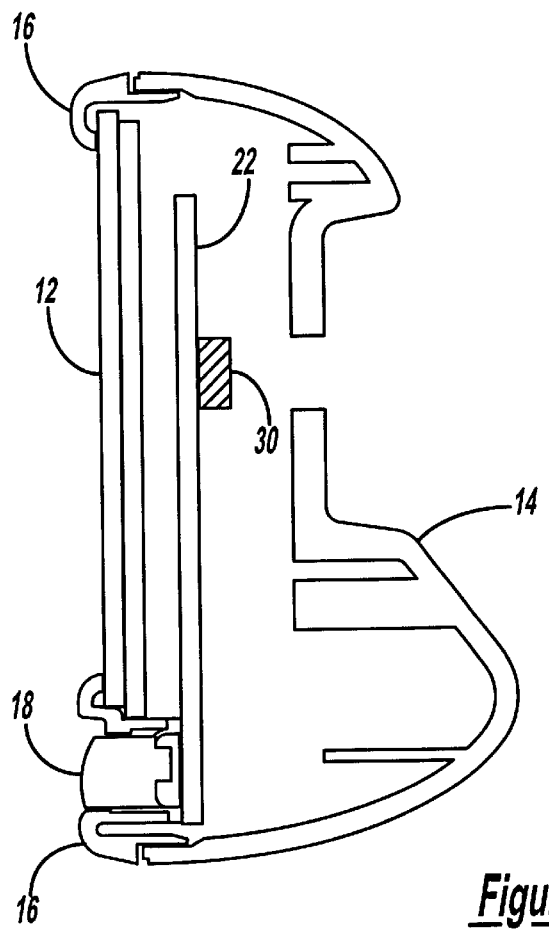
FIG. 4 is a cross-sectional view, taken along A—A of FIG. 2, through the center of the rearview mirror assembly of the present invention.

FIG. 1 shows a schematic view illustrating various rearview mirror assemblies which are adapted in a conventional manner to be installed in a motor vehicle. For instance, an interior center-mounted rearview mirror assembly 10 couples to the front windshield via a support 11 which extends from the mirror assembly 10. As will be apparent to those skilled in the art, the rearview mirror assembly 10 faces the rear of the vehicle and can be viewed by the driver of the vehicle. While the following description is provided with reference to an interior center-mounted rearview mirror assembly, it is readily understood that the explanation is applicable to other interior and/or external mirror assemblies which are for use in a motor vehicle.

Figure 2:
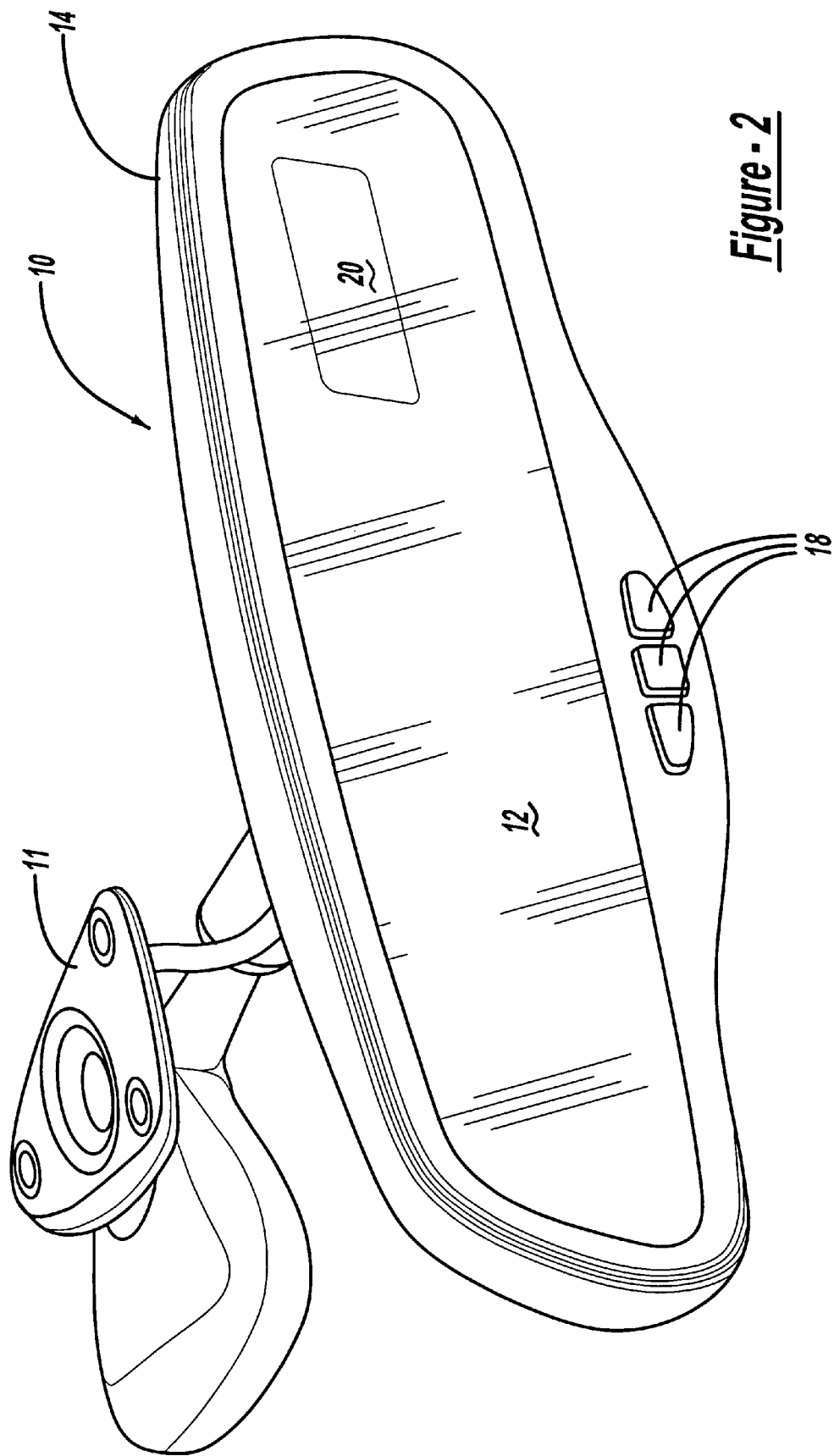
FIG. 2 is a front perspective view of a rearview mirror assembly in accordance with the present invention.
Figure 3:
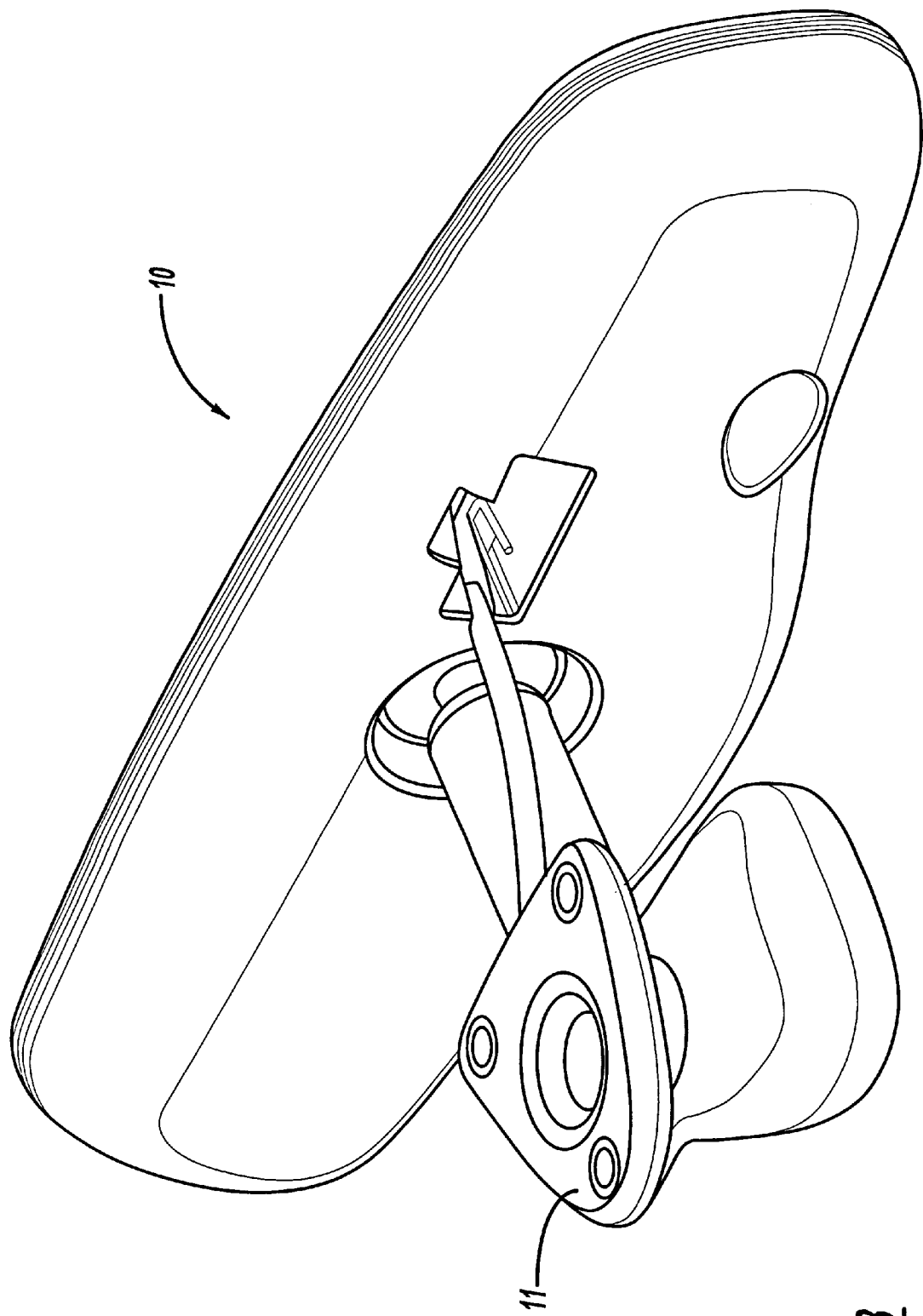
FIG. 3 is a rear perspective view of the rearview mirror assembly of the present invention.

Referring to FIG. 2, the rearview mirror assembly 10 includes a mirror member 12, a housing 14, and a plurality of switches 18, and a display device 20 embedded into the mirror member 12. The switches 18 are used to operate one or more electronic components associated with the mirror assembly 10, such as map courtesy lights (not shown) mounted on the underside of the mirror assembly 10.

In a first preferred embodiment, an electrochromic mirror is used as the mirror member 12 for the rearview mirror assembly 10. In general, an electrochromic mirror automatically dims to eliminate unwanted headlight glare from following vehicles. To do so, the electrochromic mirror is comprised of a relatively thin electrochromic medium sandwiched and sealed between two glass elements. More specifically, the electrochromic medium is disposed in a sealed chamber defined by a transparent front glass element, a peripheral edge seal and a rear glass element. Conductive layers are provided on the inside of the front and rear glass elements. The conductive layers are connected to electronic circuitry which is operable to electrically energize the electrochromic medium. The rear glass element also includes a reflective layer which provides the reflective characteristic of the mirror. In this case, the mirror assembly further includes a drive voltage supply for the electrochromic medium, an ambient light sensor, a glare light sensor, as well as their associated electronic circuitry.

In operation, a forward-facing ambient light sensor recognizes low ambient light levels and signals to the electrochromic mirror to begin detecting unwanted glare. A rearward-facing glare sensor then detects glare from vehicles traveling behind the vehicle and sends a voltage to the electrochromic medium in proportion to the amount of glare detected. As a result, the mirror dims in proportion to the glare. When the glare is no longer detected, the glare sensor ceases to provide a voltage to the mirror. Although the present invention is not limited to an electrochromic mirror, an exemplary electrochromic mirror is manufactured by the Gentex Corporation of Zeeland, Mich.

There are a variety of known housings for rearview mirror assemblies, but a preferred housing 14 is shown in FIGS. 2–5. In this case, the housing 14 is a single-piece casing molded from a thermoplastic material. A bezel 16 is used to conceal the peripheral edge portions of the mirror member 12 as well as to couple the mirror member 12 to the housing 14. Thus, the bezel 16 extends around the entire periphery of an opening in the housing 14 and attaches to an interior surface of the housing 14. There are a variety of known bezel designs which may be used to couple the mirror member 12 to the housing 14.

The housing 14 is further adapted to support a circuit board 22. The circuit board 22 is preferably a conventional circuit board, such that it includes a series of metal traces deposited on a substrate. In this way, various electronic components and circuitry can be incorporated into the rearview mirror assembly 10. In accordance with the present invention, a trip computer 30 for determining vehicle trip information is coupled to the circuit board 22. A trip computer generally provides the driver with vehicle trip information, including but not limited to outside ambient temperature, compass reading, average fuel economy, instantaneous fuel economy, a trip odometer reading and elapsed ignition on time. One skilled in the art will readily recognize that extraneous vehicle information is needed for determining the above-described vehicle trip information at the trip computer 30. As will be more fully explained below, the trip computer 30 is therefore electrically connected via a bus network to the vehicle data communication system. An exemplary mini-trip module for use in a mirror assembly is available from DaimlerChrysler of Auburn Hills, Mich.

Figure 5:
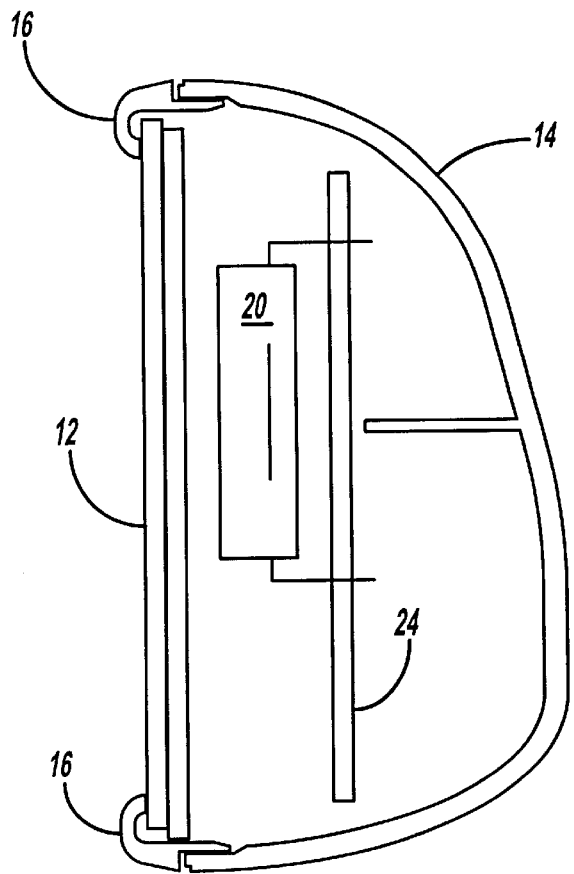
FIG. 5 is a cross-sectional view, taken along B—B of FIG. 2, through the display device of the rearview mirror assembly of the present invention.

A display device 20 is used for displaying the vehicle trip information to the driver. Thus, the display device 20 is electrically connected to the trip computer 30. As shown in FIG. 5, the display device 20 is positioned behind the mirror member 12, such that a section of its reflective material is partially removed to exposed the display device 22 to the driver. The display device 20 is coupled to a second display circuit board 24, where the housing 14 is adapted to support the second circuit board 24. Although a vacuum fluorescent display is presently preferred, this is not intended as a limitation on the broader aspects of the present invention. On the contrary, other types of display devices may be suitable, including liquid crystal displays, field emission displays and light emitting diode displays.

Figure 6:
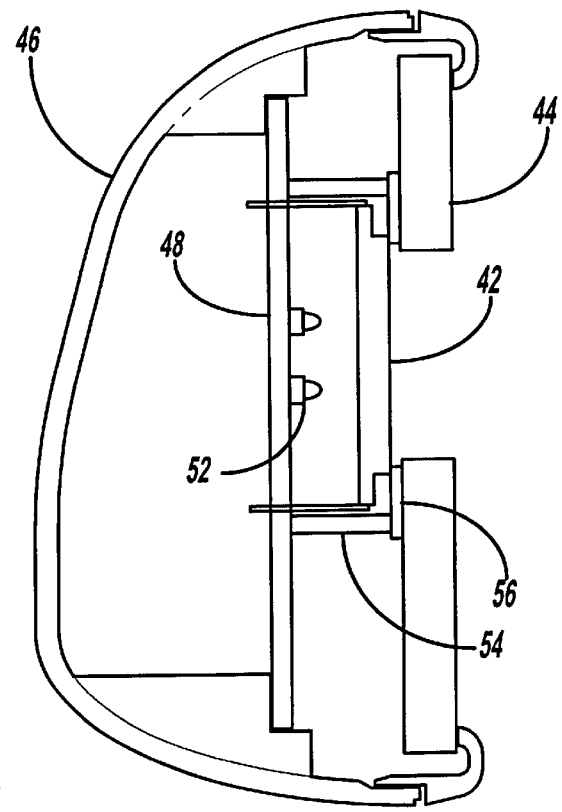
FIG. 6 is a cross-sectional view, taken along B—B of FIG. 2, of an alternative embodiment of the rearview mirror assembly of the present invention.

An alternate embodiment of the rearview mirror assembly 40 is shown in FIG. 6. To improve high ambient daylight visibility and reduce electromagnetic interference inherent with the drive power supply associated with VF display devices, a liquid crystal display (LCD) device 42 is incorporated into the rearview mirror assembly 40. Although different types of LCD devices may be incorporated into the present invention, an exemplary LCD device is manufactured by Optrex America, Inc. of Detroit, Mich.

Again, the rearview mirror assembly 40 includes a mirror member 44 and a housing 46, where the reflective member 44 couples to an interior surface of the housing 46. As shown, the LCD device 42 is positioned behind the mirror member 44, such that a section of its reflective material is partially removed to exposed the LCD device 22 to the driver. In this case, the LCD device 42 is coupled via two or more soldering pins 47 to a circuit board 48. The circuit board 48 is in turn coupled to the interior surface of the housing 46.

Two or more sub-miniature light emitting diodes (LEDs) 52 serve as the light source for the LCD device 42. The LEDs 52 are also coupled to the circuit board 48. As shown, a light shield 54 for enclosing the LEDs 52 is positioned between the reflective member 44 and the circuit board 48. In this way, the light shield 54 is used to eliminate any ambient light which may diminish the contrast of the LCD device 42. An anti-rattle pad 56 for reducing vibrations may be positioned between the light shield 54 and the mirror member 44. It is also noteworthy that an incandescent lamp may be used in place of the LEDs. In this case, a parabola surface may be used to focus and direct the light towards the LCD device 42.

Figure 7:
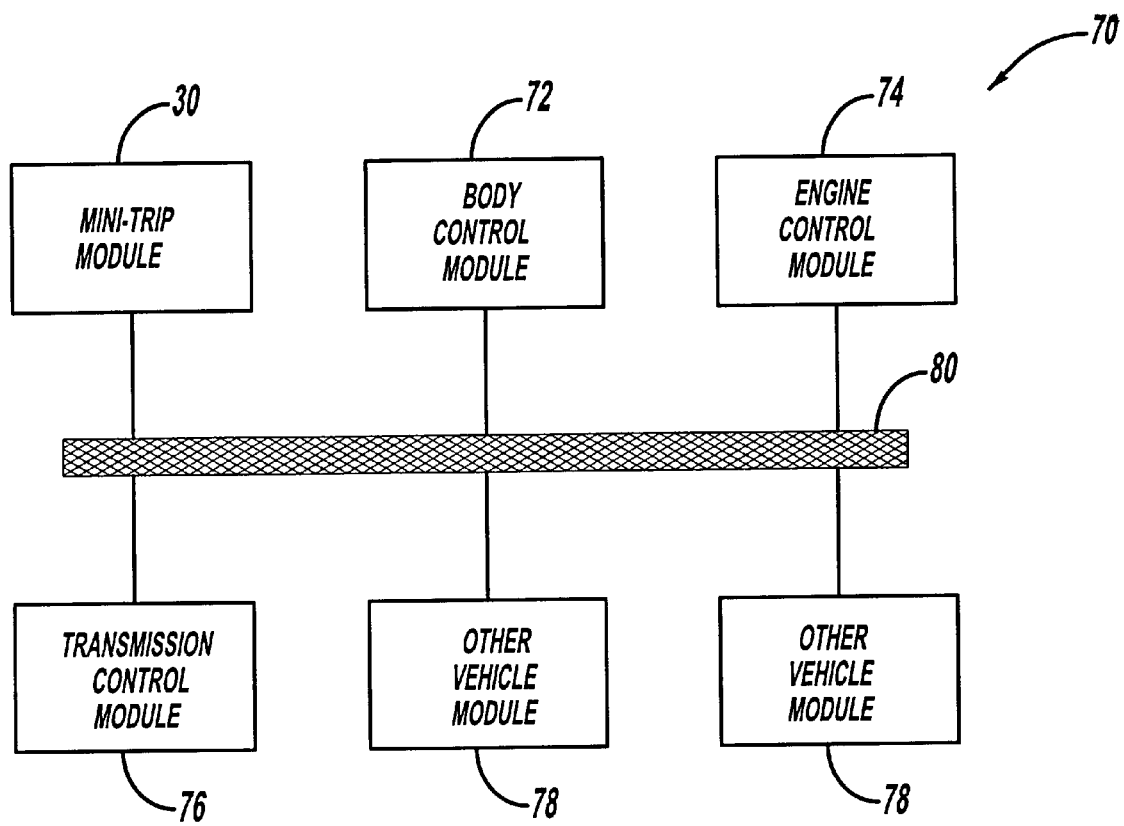
FIG. 7 is a block diagram showing the components of a vehicle data communication system in accordance with the present invention.

In accordance with the present invention, a vehicle data communication system 70 is depicted in FIG. 7. In order to receive extraneous vehicle trip information, the trip computer 30 is interconnected to other vehicle control modules within the vehicle. For instance, a body control module 72, an engine control module 74, a transmission control module 76 and other vehicle control modules 78 may communicate with the trip computer 30 using a bus network architecture. The various control modules communicate with each other via messages whose structure and characteristics are defined by a known communication protocol (e.g., the SAE J1850 standard). A single wire serial data communication network or bus network 80 is used to carry the messages between the vehicle control modules. As will be apparent to one skilled in the art, a two wire bus network might also be used to interconnect the modules. Each vehicle control module usually includes a microprocessor or microcontroller and its associated bus interface circuitry as is well known in the industry.

In accordance with the present invention, the trip computer 30 receives vehicle speed, odometer information and outside air temperature information from the engine control module 74. This information is then used to calculate at least some of the vehicle trip information. In addition, the trip computer 30 receives an ignition on message from the body control module 72. The ignition on message may be used by the trip computer 30 to power up its display device and/or the electrochromic mirror.

Furthermore, by interfacing with other vehicle control modules, the trip computer 30 is able to incorporate other enhanced functionality into the mirror assembly 10. For instance, the trip computer 30 may receive gear selection information from the transmission control module 76. Upon detecting that the vehicle is in reverse, the trip computer 30 may terminate the anti-glare feature of an electrochromic mirror. The trip computer 30 may also transmit information to other vehicle control modules. For example, when a courtesy map light is turned on, a message is sent by the trip computer 30 to the body control module 72. In the event the ignition is turned off and the light is inadvertently left on by the driver, the light can be turned off as part of a typical time-out function provided by the body control module 72. By interfacing the trip computer with other vehicle control modules, it is envisioned that other functions may be incorporated into the mirror.

Figure 8:
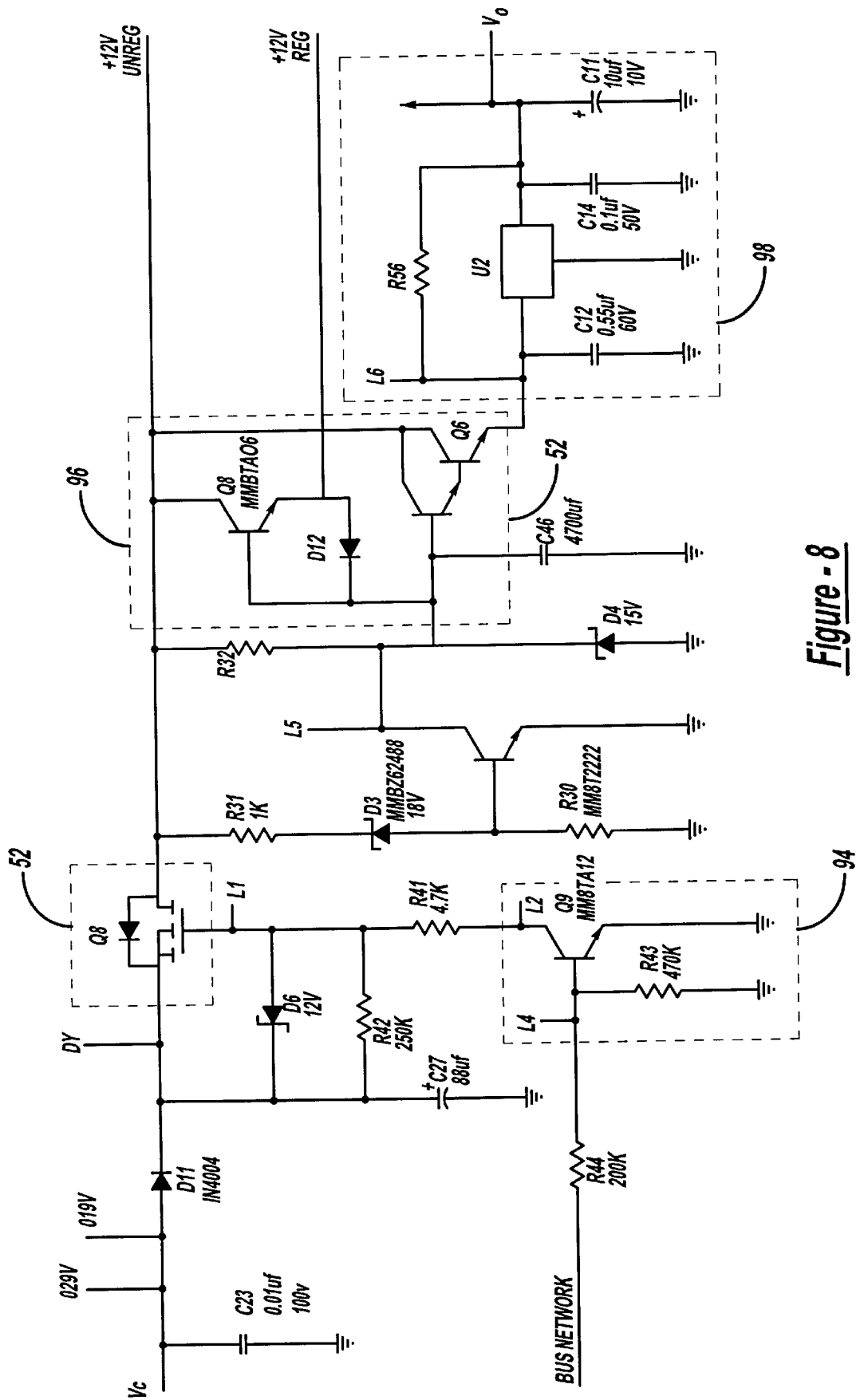
FIG. 8 is a schematic of a wake-up circuit for use in the trip computer of the present invention.

In order to power up the trip computer, the present invention utilizes a wake-up circuit which is responsive to any bus activity occurring in the vehicle data communication system 70. A preferred embodiment of a wake-up circuit 90 is shown in FIG. 8. The wake-up circuit 90 includes a signal input stage 92, a bus detection stage 94, a noise isolation stage 96, and a signal output stage 98. Upon detecting bus activity on the bus network 80, the bus detection stage 94 switches on the input stage 92. As a result, the input stage 92 provides voltage to the output stage 98 which in turn applies power to the trip computer 30. Once powered up, the trip computer 30 then waits for the body control module 72 to send an ignition on signal over the bus network 80. When the ignition on signal is received by the trip computer 30, it will in turn power up the display device 20. In this way, the trip computer 30 does not need to be directly hardwired to receive an ignition on signal from the vehicle data communication system 70.

More specifically, the bus detection stage 94 is comprised of transistor Q9 which electrically connects through a resistor R44 to the bus network 80. A bias voltage on the base of transistor Q9 indicates that messages are being sent (i.e., bus activity) over the bus network 80. The bias voltage received by the bus detection stage 94 turns on transistor Q9. In addition, the emitter of transistor Q9 is coupled to ground and the collector of transistor Q9 is connected via resistor R41 to the input stage 92.

The input stage 92 provides a switching function for an input voltage source 102. The input stage 92 is further defined as a MOSFET device 08, such that the drain of MOSFET device 08 receives an input voltage $V_i$ from the input voltage source 102. When transistor Q9 is turned on, the MOSFET device 08 is switched on. To do so, the collector of transistor Q9 is coupled through resistor R41 to the gate of MOSFET device 08. When switched on, MOSFET device 08 provides the input voltage $V_i$ to the remainder of the wake-up circuit. In this case, the input voltage source 102 is supplied by the 12-volt battery of the motor vehicle. As will be apparent to one skilled in the art, the input stage 92 further includes known circuitry positioned between the input voltage source 102 and the source of MOSFET device 08 for preventing voltage spikes in the circuit.

Next, a noise isolation stage 96 is positioned between the input stage 92 and the output stage 98. The noise isolation stage 96 includes a series pass transistor Q6, where the collector of the second transistor is coupled to the source of MOSFET device 08 from input stage 92. The emitter of the second transistor is then coupled to the output stage 98. In addition, the source of MOSFET device 08 may be coupled through switches to other electronic components associated with the mirror assembly (e.g., courtesy lights). In this way, these components receive a 12-volt power supply. Again, the noise isolation stage 96 further includes known circuitry for preventing voltage spikes in the circuit as shown in FIG. 8.

Lastly, the output stage 98 provides power to the logic circuitry associated with the trip computer 30. In particular, the series pass transistor Q6 drives a 5-volt voltage regulator U2 on, thereby applying an output voltage $V_o$ to the trip computer 30. Thus, the series pass transistor Q6 of the noise isolation stage 96 isolates the voltage regulator U2 from any noise occurring in the earlier stages of the circuit.

While the above description constitutes the preferred embodiment of the invention, it will be appreciated that the invention is susceptible to modification, variation, and change without departing from the proper scope or fair meaning of the accompanying claims.

We claim:

1. A wake-up circuit for a vehicle control module interconnected via a bus network to a vehicle data communication system of a motor vehicle, the vehicle control module being remotely located from the vehicle data communication system, comprising:

an input voltage source;

a bus detection stage for detecting bus activity on the bus network, said bus detection stage being operative to provide an input signal in response to detecting bus activity;

an input stage connected to said input voltage source and said bus detection stage, said input stage being operative to supply a voltage from said input voltage source in response to receiving said input signal from said bus detection stage, said input stage including a MOSFET device, wherein the drain of said MOSFET device is connected to said input voltage source and the gate of said MOSFET device is connected to said bus detection stage;

an output stage operatively connected to said input stage for supplying an output voltage to the vehicle control module in response to the voltage supplied by the input stage, the output stage including a voltage regulator for supplying the output voltage to the vehicle control module, wherein said voltage regulator is connected to the source of said MOSFET device; and a noise isolation stage positioned between said input stage and said output stage for isolating said voltage regulator from the remainder of the wake-up circuit.

2. The wake-up circuit of claim 1 wherein said input voltage source is further defined as a battery for the motor vehicle.

3. The wake-up circuit of claim 1 wherein said bus detection stage further comprises a transistor, wherein the base of said transistor is connected to the bus network.

4. The wake-up circuit of claim 1 wherein said noise isolation stage further comprises a series pass transistor.

5. The wake-up circuit of claim 1 wherein said vehicle control module is further defined as a trip computer embedded in a mirror assembly of the motor vehicle.

6. A wake-up circuit for a mirror module embedded in a rearview mirror assembly of a motor vehicle, the mirror module interconnected via a bus network to a vehicle data communication system, comprising:

an input voltage source;

a first transistor for detecting bus activity on the bus network, said first transistor being operative to provide an input signal in response to detecting bus activity, said first transistor receiving a bias voltage on the base of said first transistor from said bus network;

a MOSFET device connected to said input voltage source and said first transistor, said MOSFET device being operative to supply a voltage from said input voltage source in response to receiving said input signal from said first transistor; and a voltage regulator operatively connected to said MOSFET device for supplying an output voltage to the mirror module in response to the voltage supplied by said input voltage source.

7. The wake-up circuit of claim 6 wherein said input voltage source is further defined as a battery for the motor vehicle.

8. The wake-up circuit of claim 6 wherein said first transistor receives a bias voltage on the base on said first transistor from said bus network.

9. The wake-up circuit of claim 6 wherein the drain of said MOSFET device is connected to said input voltage source and the gate of said MOSFET device is connected to the collector of said first transistor.

10. The wake-up circuit of claim 6 wherein said voltage regulator is connected to the source of said MOSFET device.

11. The wake-up circuit of claim 6 further comprises a series pass transistor positioned between said MOSFET device and said voltage regulator for isolating said voltage regulator the remainder of the wake-up circuit.

12. The wake-up circuit of claim 6 wherein said mirror module is further defined as a trip computer embedded in the rearview mirror assembly of the motor vehicle.

* * * * *